United States Patent [19]

Machida

[11] Patent Number: 4,603,589
[45] Date of Patent: Aug. 5, 1986

[54] ULTRASONIC FLOWMETER

[75] Inventor: Kaoru Machida, Ootawara, Japan

[73] Assignee: Kabushiki Kaisha Toshiba, Kawasaki, Japan

[21] Appl. No.: 686,999

[22] Filed: Dec. 27, 1984

[30] Foreign Application Priority Data

Dec. 27, 1983 [JP] Japan .................................. 58-244472
Dec. 27, 1983 [JP] Japan .................................. 58-244473

[51] Int. Cl.$^4$ .............................................. G01F 1/66
[52] U.S. Cl. ................................................. 73/861.28
[58] Field of Search ................. 73/597, 861.27, 861.28, 73/861.29

[56] References Cited

U.S. PATENT DOCUMENTS 4,011,755  3/1977  Pedersen et al. ................... 73/861.28
4,022,058  5/1977  Brown ............................... 73/861.28
4,024,760  5/1977  Estrada, Jr. .
4,176,337  11/1979 Aechter et al. ............... 73/861.27 X
4,312,238  1/1982  Rey .................................... 73/861.28
4,425,805  1/1984  Ogura et al. ....................... 73/861.29
4,480,485  11/1984 Bradshaw et al. ................ 73/861.28

FOREIGN PATENT DOCUMENTS 52-16261  2/1977  Japan .

OTHER PUBLICATIONS

Transducers for Biomedical Measurements; Richard S. C. Cobbold; 1974, pp. 275-280.

Primary Examiner—Charles A. Ruehl
Attorney, Agent, or Firm—Oblon, Fisher, Spivak, McClelland & Maier

[57] ABSTRACT

An ultrasonic flowmeter for ultrasonically measuring physical parameters of a media flowing in a measuring path between two ultrasonic transducer circuits each including transmitting and receiving circuits, each including respective transducers. The measuring path has at least one component in the direction of flow and over which ultrasonic signals are sent alternately upstream and downstream. A detector connected to the receiving circuit operates to detect an envelope curve of the received ultrasonic signal. After detecting the envelope curve of the ultrasonic signal, the zero-crossing point of the envelope curve is determined electrically or arithmetically. The propagation period of ultrasonic waves is developed by defining the zero-crossing point as the beginning of receiving of the ultrasonic signal. Then, the velocity of flow and the volume of flow are calculated based on the propagation periods obtained from the envelope curve of the received ultrasonic signal.

5 Claims, 6 Drawing Figures

ULTRASONIC FLOWMETER

BACKGROUND OF THE INVENTION

1. Field of the Invention

The invention generally relates to an apparatus for ultrasonically measuring with high accuracy physical parameters of flowing media, more particularly the speed and volume of gas flow, by utilizing a resonance transmitter, as, for example, occurs in the measurement of gas flow in the study of respiratory function.

2. Description of the Prior Art

The operation of acoustic type flow-measuring meters type is based upon the principle that the propagation velocity of an acoustic wave in a gas flow is equal to the acoustic velocity with respect to the gas flow plus the velocity of the gas flow. Typically, such meters include a pair of acoustic transducers each adapted for both generating and detecting an acoustic pressure wave in a flow the velocity of which is to be measured. The transducers are disposed so as to define a communication link therebetween, which extends, at least obliquely, along the direction of flow. The transducers transmit an acoustic-wave packet, in turn, in alternate directions across the link while measuring the acoustic propagation period, also referred to as the acoustic time of flight, in both the upstream and the downstream directions. Finally, a difference between the upstream and downstream propagation periods is determined and provides a measure of the line integral through a velocity profile across the link of the component of gas flow in the direction of the link, usually referred to simply as the flow velocity and amount of flow.

Generally, the intensity of an ultrasound wave travelling through a medium may be attenuated by any of several different mechanisms. The ultrasonic absorption coefficient of a medium depends upon the characteristics of the medium, including its frequency characteristic. The absorption typically increases with increasing frequency, such that the high frequency components of a pulse are attenuated more than the low frequency components.

One of the most common methods by which a short ultrasonic pulse may be generated is by the application of a transient electrical pulse to the transducer. This can be done, for example, by suddenly discharging a capacitor through the transducer by switching means. As a result of the sudden application of the electrical pulse, the transducer rings at its fundamental resonant frequency. For each excitation, an exponentially decaying train of ultrasonic stress waves is radiated into the load. The ultrasonic wave amplitudes decay exponentially at a rate determined by the system Q (Quality factor).

If the wave train is sufficiently long, the decaying train of ultrasonic waves interferes with the conclusion of the propagation time due to the detection of overlapping propagated ultrasonic waves resulting from the decaying ultrasonic waves and those resulting just after the application of an exciting voltage waveform to the transducer. Some difficulty may be experienced in detecting the beginning of the propagated ultrasonic waves.

SUMMARY OF INVENTION

Accordingly, an object of the present invention is to provide an improved ultrasonic flowmeter measuring a difference in propagation period, having a resonance type transmitter.

Another object of the invention is to provide an ultrasonic flowmeter in which a determination of a propagation period of the ultrasonic wave can be achieved with high accuracy.

The foregoing and other objects of the invention are achieved by providing an ultrasonic flowmeter in which a zero crossover point representing the beginning of the received ultrasonic waves in a receiver is determined based on the received ultrasonic waves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
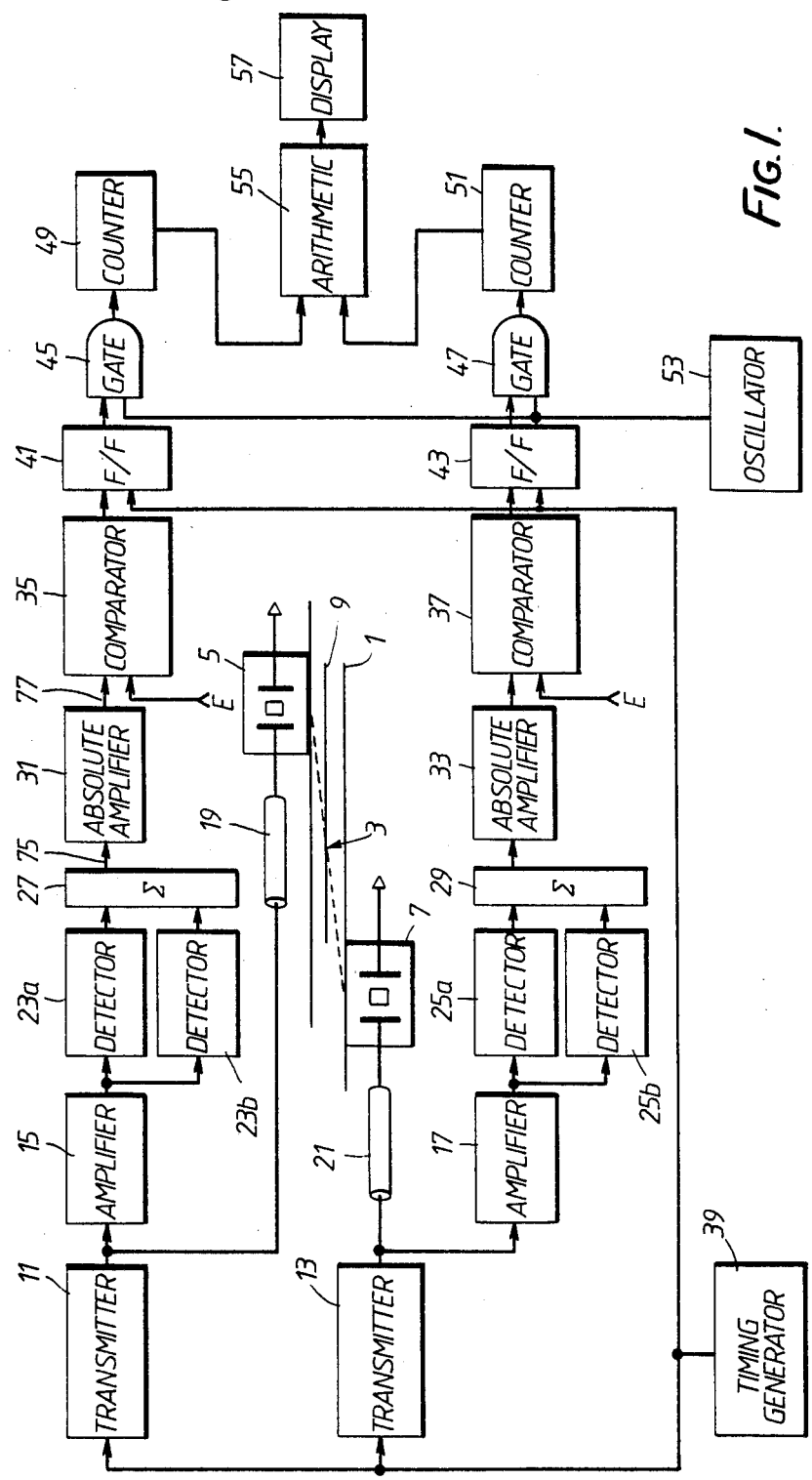
FIG. 1 is a schematic diagram of an exemplary embodiment of an ultrasonic flowmeter in accordance with the present invention.

Referring now to the drawings, wherein like reference numerals designate identical or corresponding parts throughout the several views, and more particularly to FIG. 1 thereof, an ultrasonic measuring path 3 disposed in channel 1 is bounded by two ultrasonic transducers 5 and 7 and arranged obliquely to the flow direction 9 of the medium flowing through the channel 1. These transducers 5 and 7 are spaced by a predetermined distance apart from each other on the channel 1. As is well known in the art, each of the transducers 5, 7 is a transducer which outputs an ultrasonic signal in response to an electrical signal applied by a respective resonance type transmitter 11, 13 and outputs an electrical signal to respective amplifier 15, 17 in response to an input ultrasonic signal. Each transducer 5, 7 is connected to the corresponding signal processing circuit by using a respective shielded cable 19, and 21. The amplifiers 15, 17 are connected electrically to respective detectors, designated generally by the numerals 23 and 25, which are supplied with the output signals from the respective amplifiers 15, 17 to detect an envelope curve of the respective received ultrasonic waves. In detectors 23a and 25a, the positive envelope curves are obtained corresponding to the positive components of the received ultrasonic waves. In detectors 23b and 25b the negative envelope curves are obtained corresponding to the negative components of the received ultrasonic waves. The results from the detectors (23a, 23b) and (25a, 25b) are transferred to the respective adders 27 and 29 to add the positive envelope curve to the negative envelope curve, and provide an analog sum voltage, the result of the adding, to respective absolute amplifiers 31 and 33 which amplify the absolute component of the respective sum voltages from the adders 27, 29. The outputs of the absolute amplifiers 31 and 33 are respectively provided to comparators 35 and 37, in which the amplified absolute components are compared with a reference voltage E, to provide output pulses representing the beginning of detecting the ultrasonic waves based on the cross-over portion of the reference voltage and the absolute value of the sum voltages amplified by the absolute amplifiers 31 and 33. A timing generator 39 delivers a transmission signal to the transmitters 11 and 13, and control signals to flip-flops 41 and 43, which are fed as set signals to inputs of the flip-flops 41 and 43. The flip-flops 41 and 43 are reset by the output pulses of the respective comparators 35 and 37. The outputs of the flip-flops 41 and 43 are connected through respective gates 45 and 47 to the inputs of respective counters 49 and 51. The counters 49, 51 are made inoperative in correspondance with the outputs of the respective gates 45, 47. The counters 49, 51 are pulsed by a commercially available oscillator 53. The stored count from the counters 49, 51 are transferred to an arithmetic circuit 55 for calculating the velocity of flow, and the volume of flow. A display unit 57 is provided to display the flow velocity and volume of flow according to the output of the arithmetic circuit 55.

Figure 2:
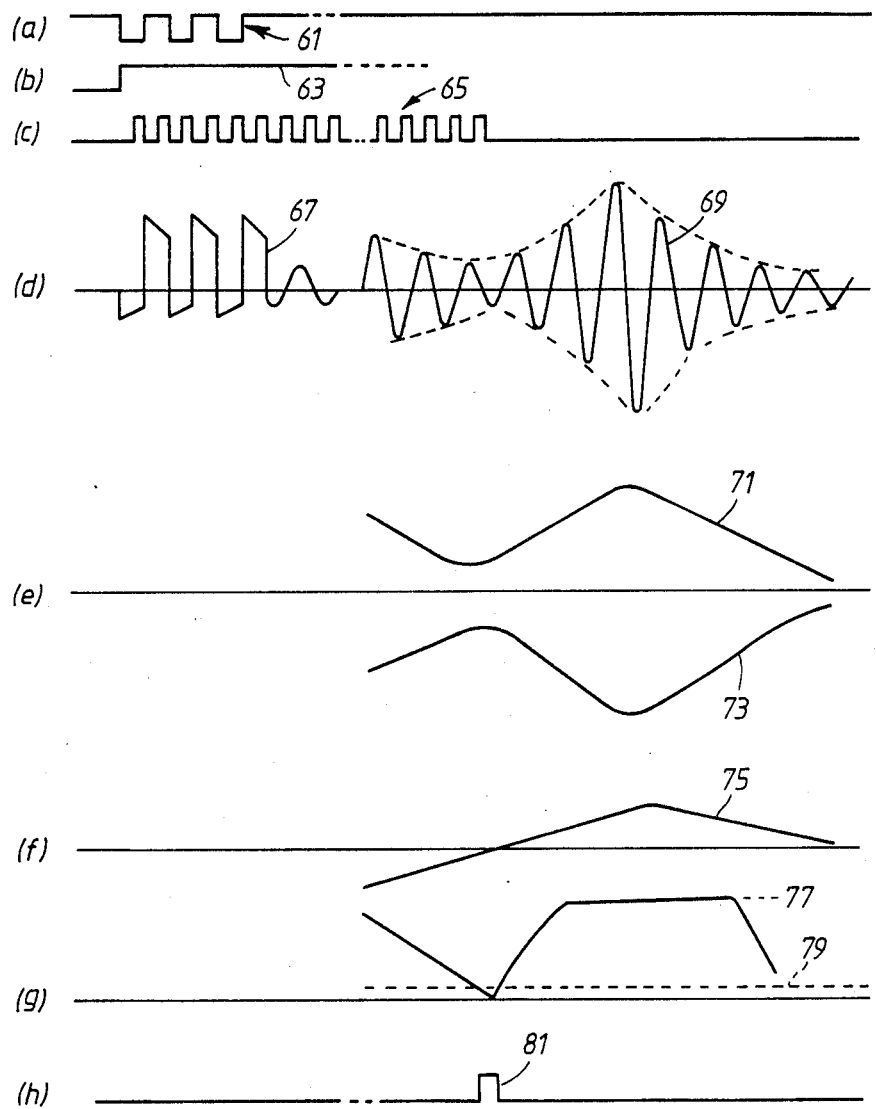
FIG. 2 is a timing diagram illustrating the signal timing of the ultrasonic flowmeter of FIG. 1.

In order to explain the operation of the ultrasonic flowmeter according to the present invention, additional reference is made to the timing diagram shown in FIG. 2. Illustrated therein, generally designated by the number 61 in FIG. 2(a), is the waveform of the transmission signal generated by the timing generator 39 which cause the transmitter 11, 13 to excite the transducers 5, 7. The flip-flops 41 and 43 are set in synchronism with the positive-going transition of the transmission signals provided by the timing generator 39. (See FIG. 2(b)). When the logic level of the signal provided by the timing generator 39 is high, illustrated at 63, the oscillator 53 supplies the impulse series illustrated at 65 in FIG. 2(c) to the counters 49, 51 through the gates 45, 47. The transmitters 11 and 13 activated by the transmission signals from the timing generator 39 generate exciting signals, illustrated at 67 to be supplied to the transducers 5, 7. The transducers, 5 and 7 in turn shock excited by the transmitters 11 and 13, alternatively generate ultrasonic waves for transmission in alternate directions in measuring path 3. For example, the transducer 5 receives the ultrasonic waves propagated through the medium flowing generated by the other transducer 7. Then, the transducer 5 converts the ultrasonic signal to an electrical signal, illustrated at 69 in FIG. 2(d), and provides the electrical signal to the amplifier 15. The received signal 69 amplified in the amplifier 15 is transferred to the detector 23, in which the envelope curve of the amplified signal is detected. More particularly, the positive envelope curve of the amplified signal, illustrated at 71 in FIG. 2(e), is detected by the positive envelope curve detector 23a, and the negative envelope curve of the amplified signal, illustrated at 73 in FIG. 2(e) is detected by the negative envelope curve detector 23b. The two signals detected by the detector 23, which represent the envelope curves of the received signal, are supplied to the adder 27, which generates the sum signal resulting from the adding, illustrated at 75 in FIG. 2(f). After being transferred to the absolute amplifier 31, the absolute value of the sum signal of the adder 27 is amplified by amplifier 31, and is illustrated at 77 in FIG. 2(g). The comparator 35 compares the absolute value 77 with the reference value illustrated at 79 in FIG. 2(g). When the absolute value 77 exceeds the reference level, the comparator 35 develops the strobe signal whose logic level is high so as to have the flip-flop 41 reset at the trailing edge of the signal, which is illustrated at 81 in FIG. 2(h). After resetting the flip-flop 41, the gate 45 is closed, which halts the counting operation of the counter 49. The pulse signal transmitted to the counter 49 via the gate 45 from the oscillator 53 to the counter 49 is counted and stored during a propagation period when the ultrasonic signal generated by the transducer 7 is received by the transducer 5. The counter 51 is made inoperative in the same manner in the alternative direction. In the arithmetic circuit 55, the velocity of flow is determined corresponding to the time difference between the propagation period in both directions. Then the volume of flow is obtained based upon the velocity determined by integrating over the propagation period. A velocity of flow and a volume of flow are displayed on the display unit 57.

Figure 3:
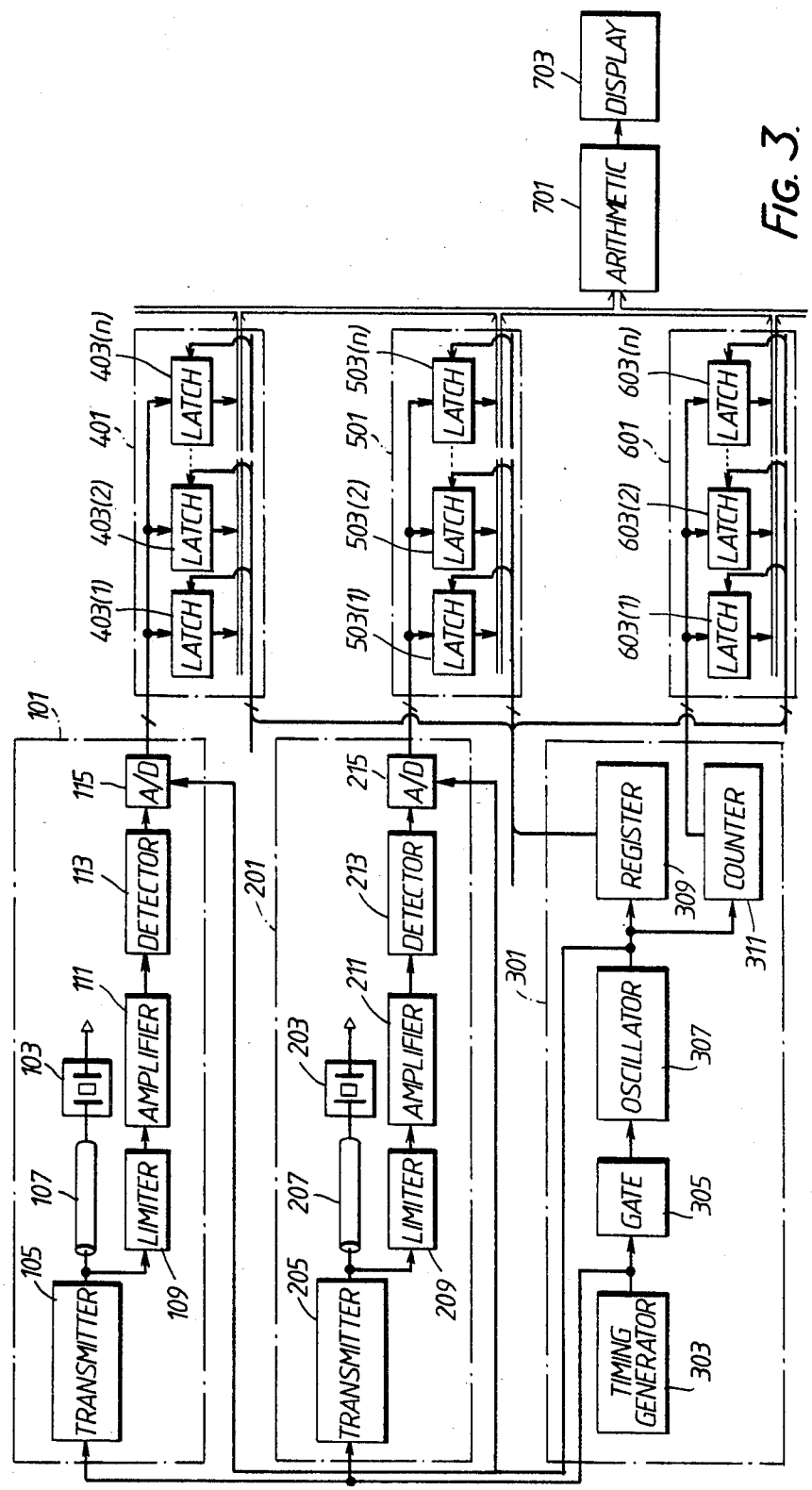
FIG. 3 is a schematic diagram showing a second example of the ultrasonic flowmeter according to the invention.

Turning now to FIG. 3, a schematic diagram illustrating an alternative embodiment is shown. The ultrasonic flowmeter according to this embodiment of the present invention includes two transmitting-receiving circuits 101, and 201, timing control circuit 301, and three output processors 401, 501, and 601 connected to the transmitting-receiving circuits 101, 102, and timing control circuit 301. The ultrasonic flowmeter further includes the arithmetic circuit 701 and the display unit 703.

The principal components of subsystem 101(201) include a transducer 103(203), a resonance type transmitter 105(205), a limiter 109(209), an amplifier 111(211), a detector 113(213), and an analog-digital converter, hereinafter referred to as A/D converter, 115(215). Detector 113(213) detects an envelope curve of the received ultrasonic signal. A/D converter 115(215) converts the analog output of the detector 113(213) to a digital signal.

The principal components of timing control circuit 301 include a timing generator 303, a gate 305, an oscillator 307, a shift register 309 and a counter 311. The function of timing control circuit 301 is to trigger each transmitter 105(205) by the transmission signal developed by the timing generator 303, activate the A/D converter 115(215) with a predetermined timing, and cause three output processors 401, 501, and 601 to store the respective outputs from the transmitting-receiving circuits 101, 201 and the timing control circuit 301 under control. Gate 305 is connected so as to operate the oscillator 307 which generates a sampling signal during a propagation period of the ultrasonic wave in the measuring path. Shift register 309 develops control pulses which are applied to the output processors 401, 501, and 601 responsive to the impulse series generated by the oscillator 307. Counter 311 counts the impulse series from oscillator 307, and develops sampling signals which are applied to output processor 601 responsive to the counter content.

The output processor 401 has latch circuits 403(1), 403(2) and 403(n) for storing successive digital outputs of A/D converter 115.

In a similar fashion, output processor 501 has latch circuits 503(1), 503(2) and 503(n) for storing successive digital outputs of A/D converter 215.

Output processor 601 includes latch circuits 603(1), 603(2), and 603(n) which are connected to counter 311 so as to store the subsequently developed sampling signals.

Arithmetic circuit 701 is connected so as to calculate the beginning of receiving of the ultrasonic waves by detecting the zero-crossing point responsive to the outputs of the respective transmitting-receiving circuits 101, 102, and timing control circuit 301 via the respective output processors 401, 501 and 601. In the arithmetic circuit 701, the velocity of flow is determined in correspondance with the propagation period between the transmitting ultrasonic signal and the beginning of the received ultrasonic signal. Then the volume of flow is obtained by integrating the velocity over the propagation period. The display unit 57 displays the results obtained by arithmetic circuit 701, i.e., the velocity of flow and the volume of flow.

Figure 4:
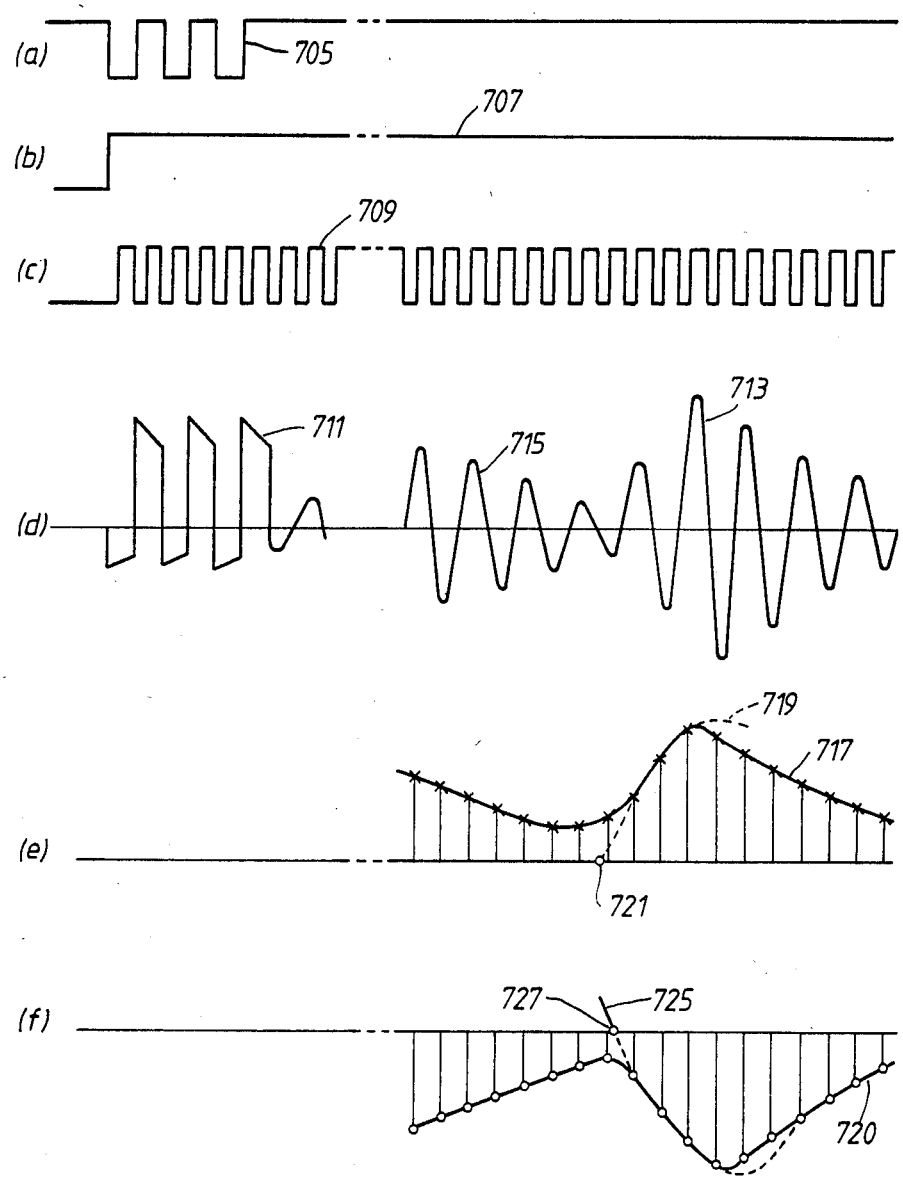
FIG. 4 is a timing diagram illustrating the signal timing of the ultrasonic flowmeter of FIG. 3.

Referring now to FIG. 4, the transmission signals generated by timing generator 303, illustrated at 705 in FIG. 4(a), are supplied to the resonance type transmitter 105(205) to excite the transducer 103(203), and at the same time is supplied to gate 305 so as to have a high logic level as illustrated at 707 in FIG. 4(b), which enables oscillator 307 to oscillate. A pulse signal, illustrated at 709 in FIG. 4(c), generated from oscillator 307 is input to shift register 309 and counter 311. Responsive to the transmission signal, the transmitter 105(205) generates an exciting signal, illustrated at 711 in FIG. 4(d), which shock-excites the transducer 103(203) so as to transmit the ultrasonic waves. The opposed transducer 203(103) receives the ultrasonic waves, and converts the received ultrasonic signals to an electrical signal illustrated at 713 in FIG. 4(d). Designated by the number 715 in FIG. 4(d) is the exponentially decaying train of ultrasonic waves which interfere with the received ultrasonic signal 713. The received signal is transferred to detector 113(213) through limiter 109(209) and amplifier 111(211), in which a positive envelope curve of the received signal is detected, illustrated at 717 in FIG. 4(e). In A/D converter 115(215), the positive envelope curve signal is converted to a digital signal responsive to a sampling signal generated from oscillator 307.

In the same manner, the transmitting-receiving circuit 201 operates so as to produce the negative envelope curve signal illustrated at 723 in FIG. 4(f). Based upon the envelope curve signals detected, approximation is performed so as to have an m dimension function, illustrated at 719(725) in FIG. 4(e) including the peak point, and (m+1) sampling points of the envelope curve. The zero-crossing point of the approximated function against the envelope curve represents the beginning of received ultrasonic signals, illustrated at 721(727) in FIG. 4(e).

Figure 5:
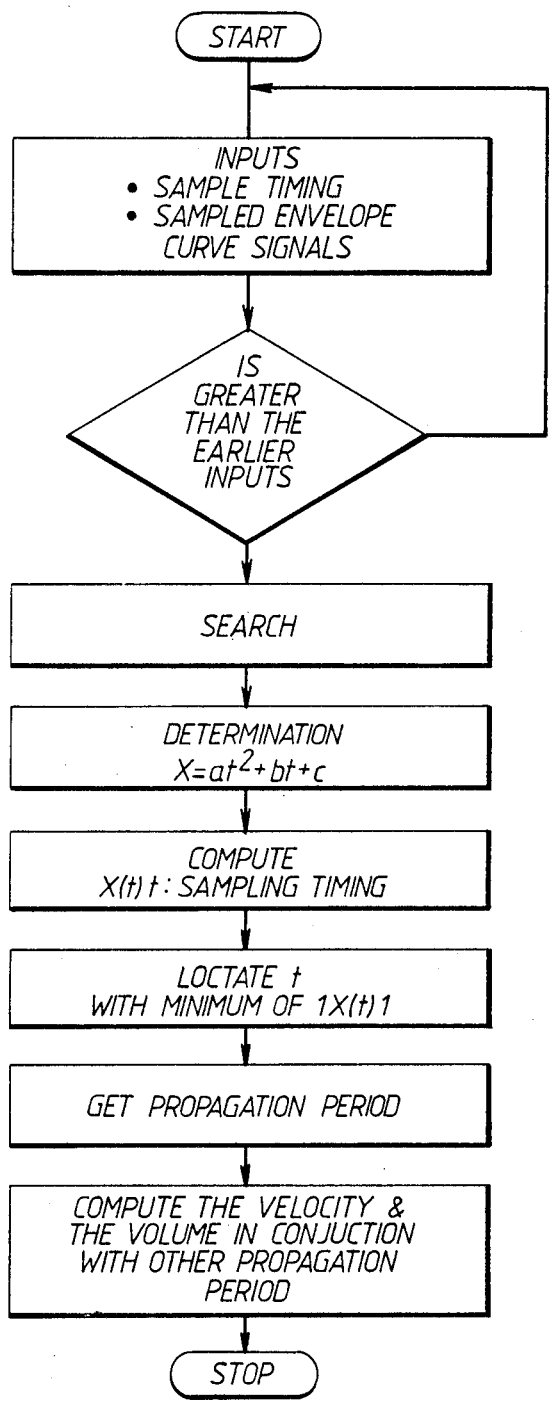
FIG. 5 is a flow chart showing the performance of processing operations in the arithmetic circuit of FIG. 3.

FIG. 5 contains the flow chart of a preferred arithmetic program for accurately performing the above-described approximation. The sampling time data and the stream of digital data representing the original envelope curve of the received ultrasonic signal are transmitted to the arithmetic circuit 701. The determination operation performed at the third step is to check whether the incoming digital data of the received ultrasonic signal is greater than the earlier one. If so, the program returns to the previous step of receiving the sampling time data and the stream of digital data of the ultrasonic signal. If not, the program moves into the next SEARCH operation. The SEARCH operation is to find the previous three sampling time data, digital data representing the positive envelope curve, and digital data representing the negative envelope curve corresponding to the sampling time. Then each value of these data is stored in a memory. The program runs to the fifth step which substitutes each value into a function of sampling time t, x (a digital value representing the received ultrasonic signal)=$at^2+bt+c$, and then calculates constants of a, b, and c. After determining the function, the operation is done to find the time when the sum of $at^2+bt+c$ is approximately near to zero at the seventh step. At the next step, the time obtained by the calculation is defined as a propagation period of the ultrasonic waves. Finally, the velocity of flow and volume of flow are determined by using the propagation period in conjunction with the propagation period obtained in the alternative direction in a similar fashion.

It is desired to select the sampling time data to decrease measuring inaccuracy arising due to time delay inherent in detectors 113, and 213.

Figure 6:
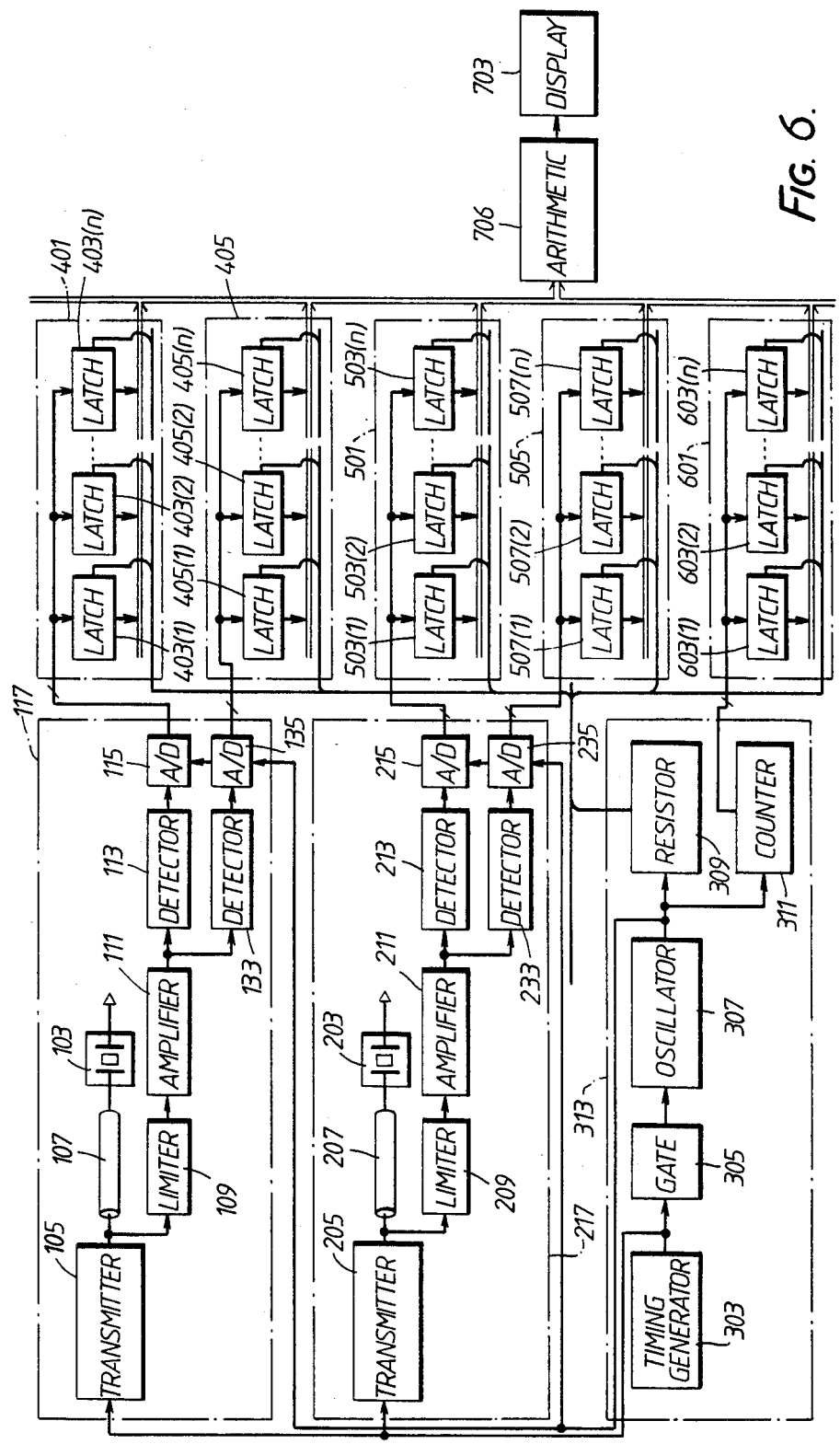
FIG. 6 is a schematic diagram showing an alternative embodiment of the ultrasonic flowmeter shown in FIG. 3.

FIG. 6 shows still another embodiment of the ultrasonic flowmeter, which represents a modification of the ultrasonic flowmeter shown in FIG. 3. The principal components of transmitting-receiving circuit 117(217) include a transducer 103(203), a resonance type transmitter 105(205), a limiter 109(209), an amplifier 111(211), and additionally two sets of detectors 113(213), and 133(233), and two sets of A/D converters 115(215), and 135(235). In each transmitting-receiving circuit 117(217), both the positive and negative envelope curves corresponding to the received ultrasonic signal are detected by the combination of two detectors 113(213) and 133(233) and A/D converters 115(215) and 135(235). According to this subsystem, the accuracy of calculating the beginning of receiving of the ultrasonic signal is increased by a processing operation being performed on the data for the two envelope curves, for example, an averaging operation. The additional detectors 133 and 233 detect the negative envelope curve of the received ultrasonic signal, illustrated at 723 in FIG. 4(f), in the respective transmitting-receiving circuits 117 and 217. Further, the A/D converters 135 and 235 convert the respective analog output corresponding to the respective envelope curve applied thereto to respective digital data. The output processors 405 and 505 are connected to the respective A/D converters 135 and 235 so as to store the digital outputs from the A/D converters 135 and 235. Output processors 405 and 505 have a plurality of latch circuits (405(1), 405(2), 405(n)) and (507(1), 507(2), 507(n)) which latch each of the data supplied by each transmitting-receiving circuit 117 or 217.

Arithmetic circuit 705 has transmitted thereto data to be processed and calculates the propagation periods of ultrasonic waves in the measuring path, the velocity of flow, and the volume of flow. In arithmetic circuit 705, an approximation operation which approximates the negative envelope curve to an m dimension function of time is performed in addition to the operation in the ultrasonic flowmeter shown in FIG. 3. As previously described, each zero-crossing point of the approximated function corresponding to each envelope curve of the received ultrasonic signal is determined, then averaging is performed on the propagation periods determined based upon the zero-crossing point of the approximated envelope curve of the received ultrasonic signal. By using the averaged value of the propagation period, the velocity of flow and the volume of flow are measured with high accuracy.